United States Patent
Tulaczko et al.

(10) Patent No.: US 6,679,366 B2
(45) Date of Patent: Jan. 20, 2004

(54) CLUTCH RELEASE ARRANGEMENT

(75) Inventors: Boleslaw Tulaczko, Schonungen (DE); Georg Zink, Gerolzhofen (DE); Dieter Gebauer, Geldersheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 38 days.

(21) Appl. No.: 10/053,334

(22) Filed: Jan. 18, 2002

(65) Prior Publication Data

US 2002/0104733 A1 Aug. 8, 2002

(30) Foreign Application Priority Data

Feb. 2, 2001 (DE) .......................... 101 04 665

(51) Int. Cl.[7] ................................ G05G 1/14
(52) U.S. Cl. ...................... 192/99 S; 74/512
(58) Field of Search .................. 192/99 S; 74/512, 74/518

(56) References Cited

U.S. PATENT DOCUMENTS

| | | | | |
|---|---|---|---|---|
| 3,199,366 A | * | 8/1965 | Herrington, Jr. | .............. 74/512 |
| 3,261,438 A | * | 7/1966 | Binder | ...................... 192/99 S |
| 3,774,471 A | * | 11/1973 | Pezza | .......................... 74/560 |
| 4,319,497 A | * | 3/1982 | Shinto et al. | .................. 74/512 |
| 4,624,152 A | | 11/1986 | Stotz et al. | .................... 74/518 |
| 4,846,012 A | * | 7/1989 | Papenhagen et al. | .......... 74/512 |
| 5,038,907 A | | 8/1991 | Baumann | .................. 192/99 S |
| 5,165,299 A | * | 11/1992 | Mizuma et al. | ................ 74/512 |
| 6,443,288 B1 | * | 9/2002 | Pinto | ......................... 192/99 S |
| 6,454,075 B1 | * | 9/2002 | Leuschke et al. | .......... 192/99 S |

FOREIGN PATENT DOCUMENTS

| | | | |
|---|---|---|---|
| GB | 2 192 227 | | 1/1988 |
| JP | 59001819 A | * | 1/1984 ........... F16D/23/12 |

* cited by examiner

*Primary Examiner*—Richard M. Lorence
(74) *Attorney, Agent, or Firm*—Cohen, Pontani, Lieberman & Pavane

(57) ABSTRACT

A release arrangement for a hydraulically actuated clutch in a motor vehicle has an energy accumulator connected with a hydraulic system. The energy accumulator is connected with a pedal via a kinematic arrangement which adapts the pedal forces to the pedal path. It is possible to adapt the boosting force characteristic to the required pedal force curve in a very precise manner. This leads to a boosting force that possibly increases the depressing force, but primarily increases the force in the boosting area following the dead center of the kinematic arrangement. The characteristic of the boosting force curve over the pedal path can be adapted to the respective operating system in the motor vehicle without major structural alterations.

3 Claims, 4 Drawing Sheets

CLUTCH RELEASE ARRANGEMENT

BACKGROUND OF THE INVENTION

1. Field of the Invention

The invention is directed to a clutch release arrangement, particularly for a clutch in a motor vehicle, including a master cylinder for a hydraulic system, a pedal for actuating the master cylinder to disengage the clutch, and an articulated energy accumulator which stores energy when the clutch is engaged and provides a boosting force which reduces the actuating force when the clutch is disengaged.

2. Description of the Related Art

Release arrangements of this type are frequently used in modern hydraulically actuated clutches and are known from practice. The energy accumulator has a spring which holds the pedal in its basic position or at least reinforces a force holding the pedal. When the pedal is depressed, the spring is pretensioned slightly. In so doing, the spring swivels until its point of application of force at the pedal goes beyond a dead center and reinforces the movements of the pedal by an added force on the pedal path following the dead center. This enables a reduction in the force expended when depressing the pedal, at least along the path following the top dead center, where the energy accumulator adds its energy as a boosting force to the pedal force.

Due to the articulation of the energy accumulator at the pedal, in particular as an over-center spring, the pedal force on the second half of the pedal path can be noticeably reduced in order to be able to overcome more easily the spring acting in the clutch of the motor vehicle, particularly at the end of the pedal path. However, known kinematic couplings of energy accumulators with a clutch pedal have shown themselves to be in need of improvement for certain applications. Above all, it is disadvantageous that the path of the force reinforcing the pedal force can not only be adjusted in height with sufficient accuracy, the variability of the reinforcement force along the pedal path can also not be adapted to the requirements of the pedal force on the pedal path. For example, when the maximum force should be further reduced, this can only be done in the known solution by increasing the force for depressing the pedal.

SUMMARY OF THE INVENTION

The invention provides an over-center kinematic arrangement which makes it possible to adapt a boosting force of an energy accumulator to the required curve of a pedal force, wherein the pedal force should also be smaller when the operator steps on the pedal and the produced force should be substantially greater in the area of the boosting force acting through the energy accumulator after passing a dead center point.

According to the invention, a kinematic arrangement between the energy accumulator and the pedal has a high degree of variability with respect to the curve of the boosting force and capable of being set to the force requirements of the clutch of any defined type of motor vehicle without changing the type of kinematics.

It is suggested that the kinematic arrangement is formed of two levers which can be arranged in the motor vehicle in a variable manner. The first lever is constructed as a swivel lever and is mounted to the chassis of the motor vehicle in an articulated manner. Accordingly, together with the end of the energy accumulator, it forms a joint at which the second lever, namely, the transmission lever for the pedal, is likewise arranged in an articulated manner and connects an arm of the pedal to the energy accumulator in an articulated manner. Aside from the lever lengths which are adapted first of all to the given structural conditions of the motor vehicle, the main parameter is the relative angular position of the two levers with respect to one another which influences the boosting force in the area following the dead center. When the selected angle is smaller, there is a greater boosting force in the area following the dead center. It will be seen that only the articulation of the cam follower at the chassis needs to be changed in order to achieve the desired adjustment of the boosting force through the energy accumulator when the pedal is actuated.

In this connection, it is assumed that the energy accumulator is arranged at the chassis so as to be swivelable and approximately forms a line with the transmission lever and the arm of the pedal up to a pedal bearing. A certain obtuse angle is advisably arranged between the three elements to form a stable rest position of the pedal. When the pedal is depressed, the angles reach 180° and, therefore, the kinematic dead center. The faster the angles change beyond this value subsequently, the higher the boosting force for the pedal, provided that the spring force available in the energy accumulator acts along the required path to adequate height.

A second modification of the kinematic arrangement described above includes only one lever which connects the chassis to the end of the energy accumulator in an articulated manner but has a rolling cam on which a roller can run, this roller being arranged at the arm of the pedal. The lever acting as cam follower is pressed against the roller at the arm by the spring force of the energy accumulator and forms a stable system when the arm approximately forms a line with the acting boosting force. As in the example mentioned above, a certain angle is provided at the rolling cam in order to stabilize the kinematics in the basic position of the pedal; this angle must first be overcome when depressing the pedal to dead center. After this dead center is overcome, the roller runs along the rolling cam and undergoes a component of the boosting force by means of the energy accumulator, which component increases as the angle of the path normal of the roller to a center axis of the arm increases. It will be seen that the proposed kinematic arrangement make it possible to adapt the curve of the boosting force for the pedal force to the requirements of the system at any point along the path of the pedal. Apart from the variability of the design of the rolling cam, the location for arranging the cam follower at the chassis is also changed, which provides additional possibilities for adapting to the requirements of the curve of the pedal force.

Another suggestion which is based on the principle of the design of a rolling cam cooperating with the energy accumulator consists in replacing the conventional energy accumulator with a simplified construction of an energy accumulator. The simplified construction includes a leg spring having one end in the chassis and another end with a roller which communicates with a rolling cam arranged at the pedal. When the pedal is actuated, the roller rolls along the cam and generates a force component which supports the actuating force of the pedal as a moment about the pedal bearing in the rotating direction of the pedal. It will also be seen in this case that the rolling cam can be optionally selected and provides a boosting force serving to adapt the pedal forces in an optimal manner for every angular position of the pedal.

The invention allows for numerous embodiment forms, some of which are shown in the drawings and are described below in order to further illustrate its basic principle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
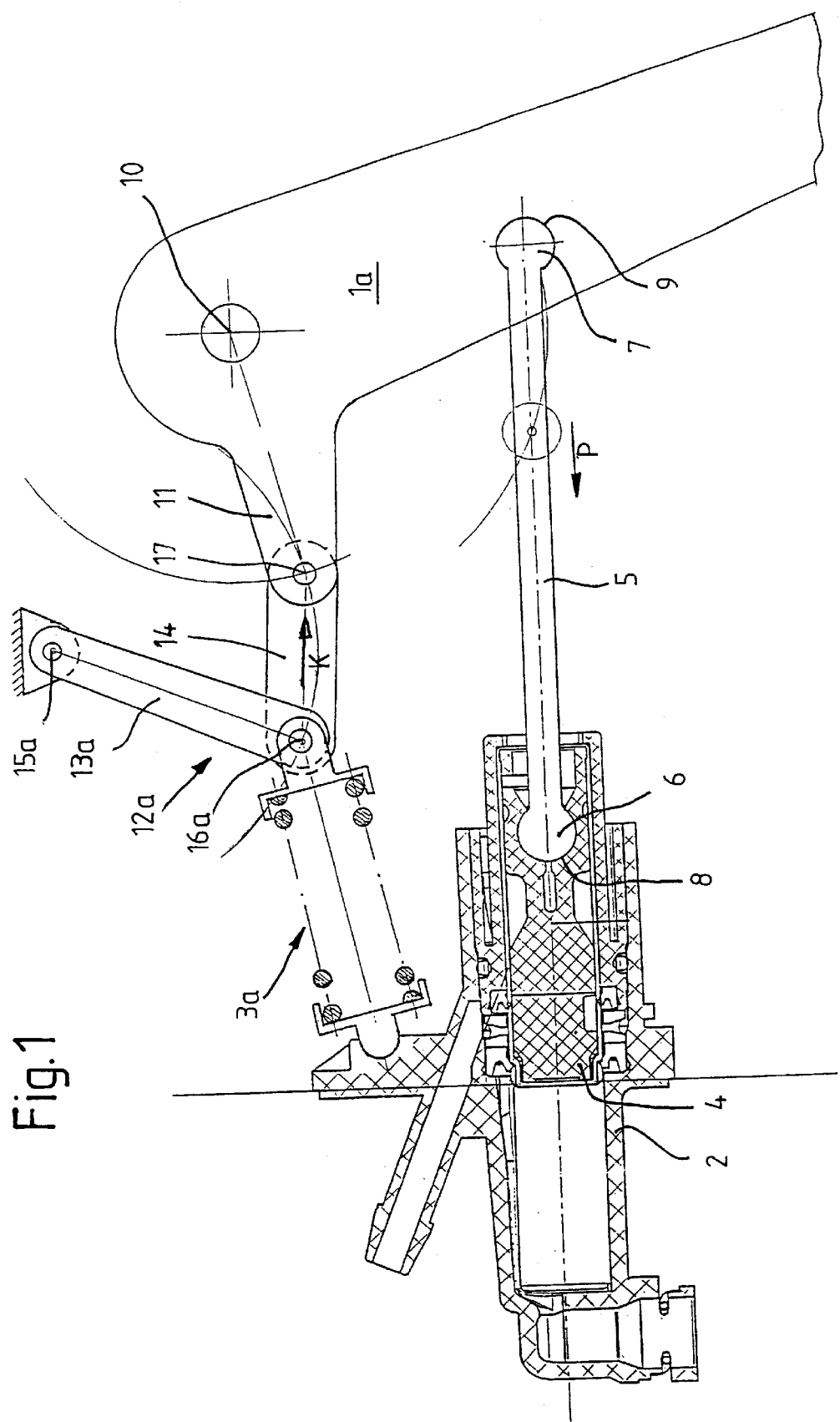
FIG. 1 shows a master cylinder whose piston is connected to a pedal by a tappet and a kinematic arrangement comprising two levers which are arranged between an energy accumulator and an arm of the pedal.

FIG. 1 shows a pedal 1a pedal bearing 10 in the chassis of the motor vehicle which communicates via a tappet 5 with a piston 4 of a master cylinder 2. The tappet 5 has a spherical head 6 on the piston side which is connected with a ball socket 8 in the piston 4 and a spherical head 7 on the pedal side which is connected with a ball socket 9 in the pedal 1a. When the pedal 1a is actuated in the clockwise direction, the piston 4 is displaced by the tappet 5 in the master cylinder 2, so that the contents of the cylinder which is filled with fluid are reduced and cause a hydraulic movement. An energy accumulator 3a comprising a heavily compressed spring generating a boosting force K for the pedal force P occurring when the pedal 1a is actuated is arranged so as to be swivelable at the master cylinder 2 or at the chassis of the motor vehicle. The connection of the energy accumulator 3a with the pedal 1a is produced via a transmission lever 14. This transmission lever 14 forms a kinematic arrangement 12a with a swivel lever 13a, wherein the arrangement of the levers 13a and 14 is carried out in the following manner: The swivel lever 13a forms a first joint 15a with the chassis of the motor vehicle and a second joint 16a with the end of the energy accumulator 3a. The transmission lever 14 is mounted in a swivelable manner by one end to the joint 16a and by its other end to an arm 11 of the pedal 1a while forming a third joint 17. When the pedal is actuated in the clockwise direction, the transmission lever 14 swivels about the second joint 16a, while the third joint 17 rotates about the pedal bearing 10 and the second joint 16a rotates about the first joint 15a which is arranged at the chassis so as to be stationary. Since the kinematic arrangement 12a is constructed as over-center kinematic arrangement, a boosting force K will act as torque on the arm 11 after the dead center point is exceeded to an increasing extent as the angle at which the transmission lever 14 is arranged relative to the swivel lever 13a becomes more acute. Once the kinematic arrangement 12a has been fixed with respect to the lever lengths, it will be seen that the position of the first joint 15a at the chassis of the motor vehicle allows great leeway for adapting the boosting force K to the requirements of the pedal path and the pedal force P.

Figure 2:
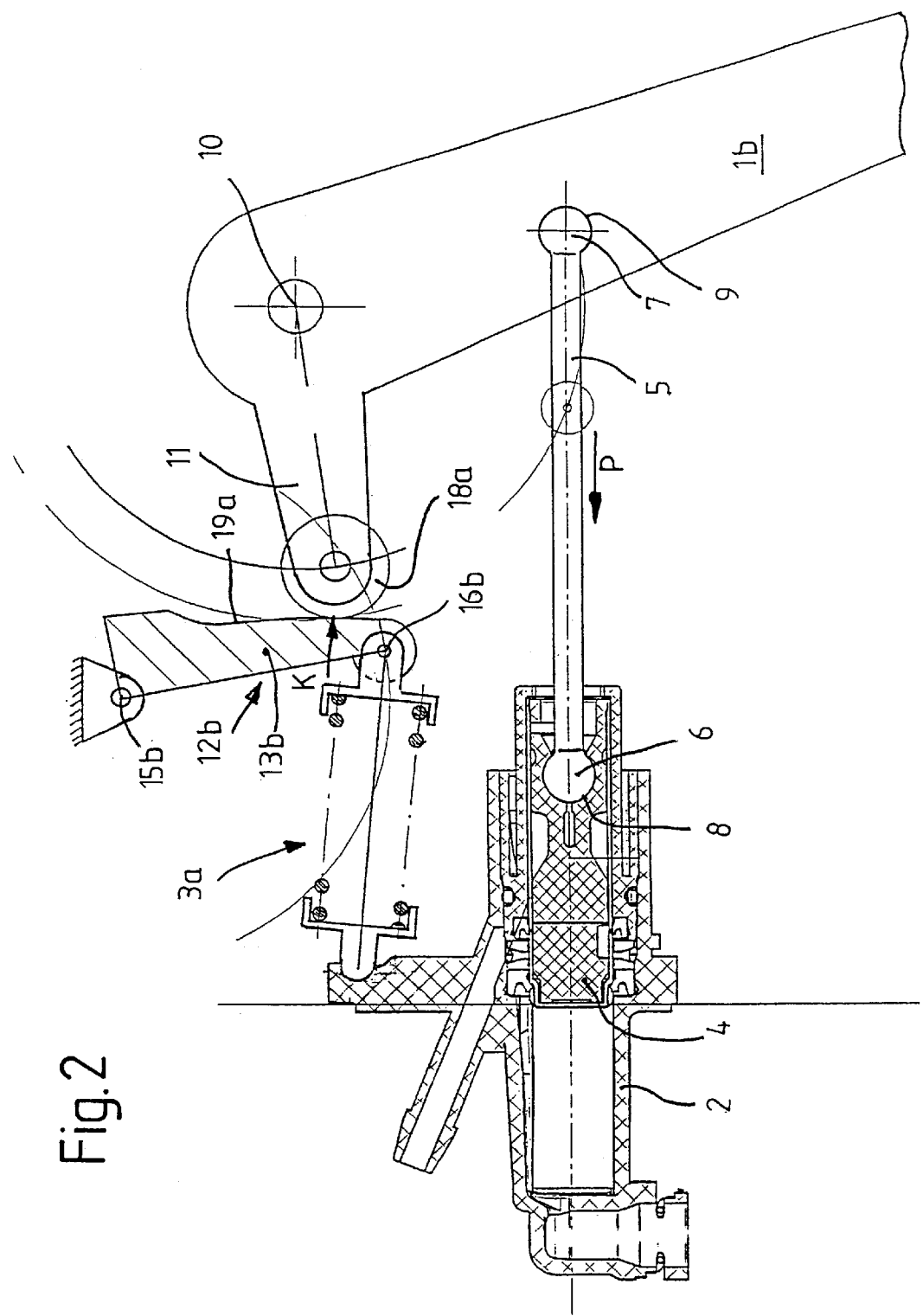
FIG. 2 shows the arrangement according to FIG. 1 in which the kinematic arrangement comprises a cam follower with a rolling cam on which a roller rolls at the pedal.

FIG. 2 shows the arrangement of the master cylinder 2 with respect to a pedal 1b in the manner described above; as before, an energy accumulator 3a is provided and forms a second joint 16b with a cam follower 13b which has a rolling cam 19a cooperating with a roller 18a at the arm 11 of the pedal 1b. Due to the high spring forces of the energy accumulator 3a, the cam follower 13b with its rolling cam 19a is pressed against a roller 18a at the arm 11 of the pedal 1b and in this way forms a kinematic arrangement 12b by which a boosting force K is generated on the arm 11 which, depending on the design of the rolling cam 9a, can be adapted to the requirements in the system in any area of the path of the pedal 1b. Apart from the variability of the design of the rolling cam 19a, it is by means of the suspension of the cam follower 13b in the first joint 15b at the chassis of the motor vehicle that changes can be brought about in the characteristic of the boosting force K depending on space requirements. The boosting force K is then expressed as an added torque at the arm 11 of the pedal 1b when the latter is actuated.

Figure 3:
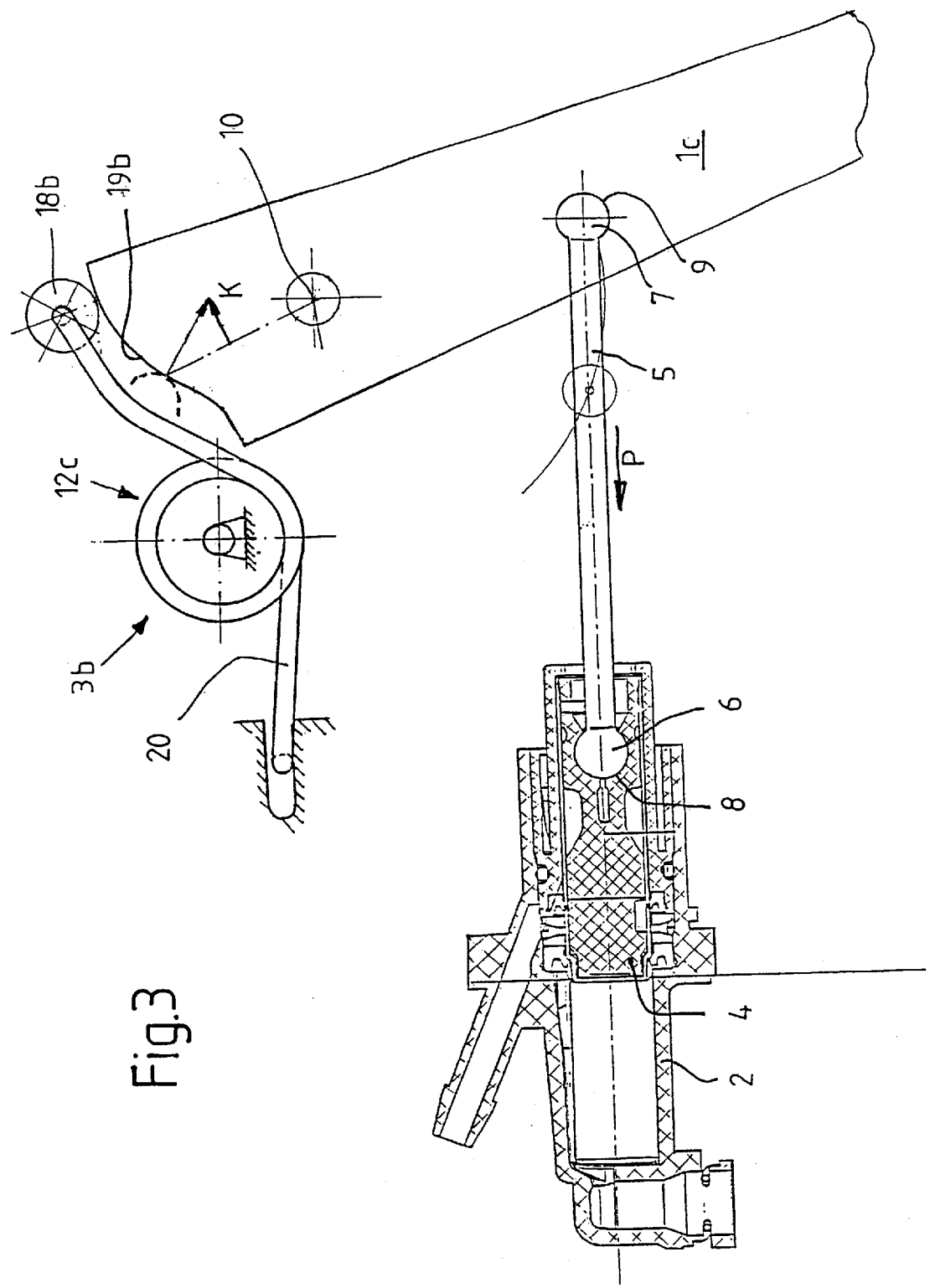
FIG. 3 shows the arrangement according to FIG. 1, but with an energy accumulator modified as a leg spring, wherein a roller which rolls on a rolling cam of the pedal is arranged at this energy accumulator.

FIG. 3 shows an arrangement of a pedal 1c at the master cylinder 2 which has a rolling cam 19b on which a roller 18b rolls. The roller 18b belongs to an energy accumulator 3b constructed as a leg spring and forms a kinematic arrangement 12c. A spring 20 of the energy accumulator 3b is constructed as a simple leg spring whose first leg is anchored in the chassis, while the second leg carries said roller 18b and accordingly transmits the pretensioning force of the spring 20 to the rolling cam 19b arranged at the pedal 1c. Depending on the construction of the rolling cam 19b, a boosting force K can be generated which is added to the operator torque of the pedal 1c as a component of the oblique plane that is formed. Compared to the kinematic arrangements 3a and 3b mentioned above, this is a highly simplified construction with respect to the number of structural component parts and allows very free adaptation of the boosting force K.

Figure 4:
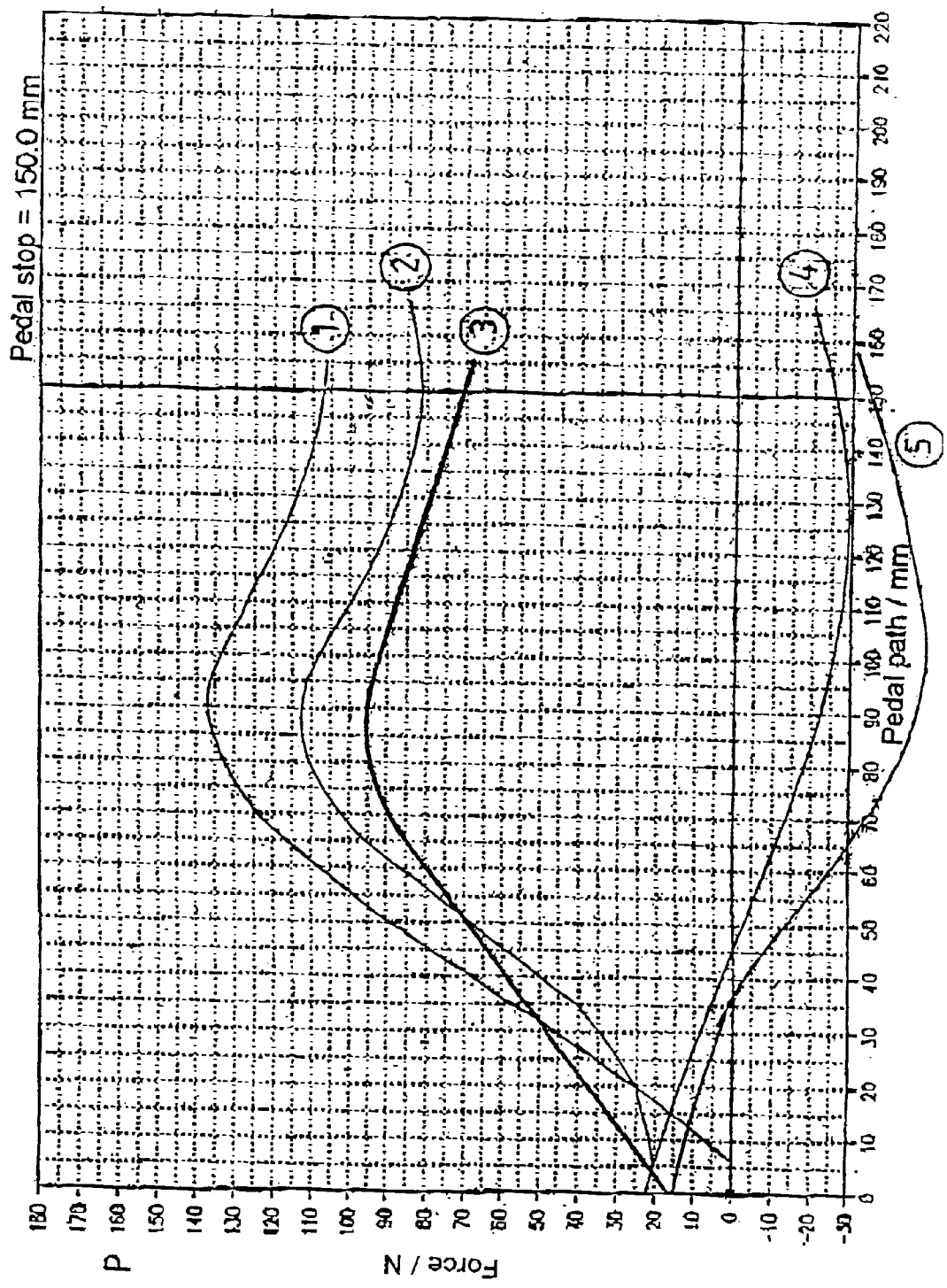
FIG. 4 shows a characteristic line for a pedal force along the path of the pedal which clarifies the differences between the invention and the prior art.

FIG. 4 shows the force progression along the pedal path with different pedal characteristics. Starting from a curve (1), only one curve (2) can be generated without any spring reinforcement with over-center kinematics according to the prior art, represented by curve (4). When a further reduction in the maximum force, e.g., according to curve (3), is necessary, this can only be initiated in prior art constructions by increasing the force exerted when stepping on the pedal 1a, 1b, 1c. Due to the present invention, it is possible to adapt the characteristic of the boosting force K to the required course of the pedal force P in a very precise manner. The solutions according to the invention shown in FIGS. 1, 2 and 3 lead to a curve (5) of the boosting force K over the pedal path. The force exerted when depressing the pedal is accordingly even smaller than in conventional spring arrangements, and a substantially greater force can also be achieved especially in the range of the effective boosting force K after the dead center.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A release apparatus for a clutch in a motor vehicle having a chassis, said arrangement comprising
    a master cylinder of a hydraulic system,
    a pedal for actuating said master cylinder to disengage said clutch, said pedal requiring an actuating force which is plotted against pedal travel during actuation of said master cylinder to produce a characteristic curve of said actuating force,
    an energy accumulator which is pivotable with respect to said chassis, said accumulator storing energy when the clutch is engaged and providing a boosting force which reduces the actuating force when the clutch is disengaged, said boosting force being plotted against pedal travel to produce a characterstic curve of said boosting force, and
    a kinematic arrangement arranged between said energy accumulator and said pedal for influencing said characteristic curve, said kinematic arrangement comprising a swivel lever and a transmission lever, wherein
        said pedal has an arm extending toward said energy accumulator, said swivel lever having a first joint at said chassis and a second joint at said energy accumulator, said transmission lever connecting said second joint to a third joint at the arm of the pedal.

2. A release apparatus as in claim 1 wherein said kinematic arrangement is an over-center arrangement having a dead center during said pedal travel, said kinematic arrangement being adapted to modify said characteristic curve primarily beyond said dead center.

3. A release apparatus as in claim 1 wherein said actuating force has a maximum which is reduced by boosting force.

* * * * *